March 9, 1943.   D. ERNST   2,313,133
EXAMINING OF GEARS, PARTICULARLY HELICAL GEARS
Filed July 17, 1941   2 Sheets-Sheet 1

INVENTOR,
Daniel Ernst
by Sommers+Young,
Attorneys

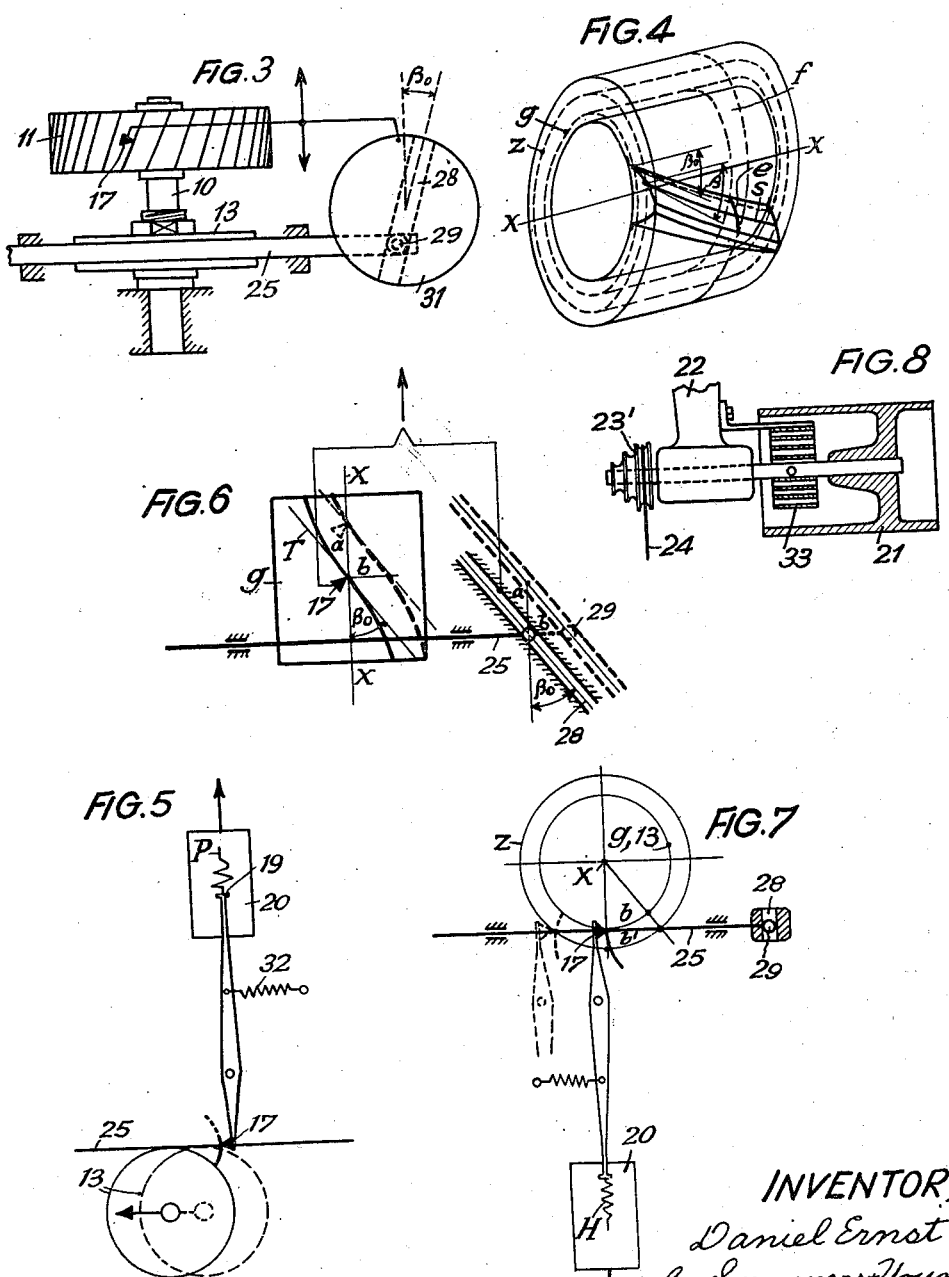

Patented Mar. 9, 1943

2,313,133

UNITED STATES PATENT OFFICE 2,313,133

EXAMINING OF GEARS, PARTICULARLY HELICAL GEARS

Daniel Ernst, Zurich, Switzerland, assignor to Maag Zahnräder &-Maschinen Aktiengesellschaft, Zurich, Switzerland Application July 17, 1941, Serial No. 402,879
In Switzerland and Germany September 19, 1940

6 Claims. (Cl. 33—179.5)

This invention relates to a device for examining gears, particularly helical gears, including a feeler member for contacting with the flanks of the gear teeth and cooperating with a recording device and further including a rolling cylinder which is fixed to the gear in coaxial relation therewith and rolls on a rectilinear path when performing a corresponding movement relative to the latter.

Devices are in existence by means of which the tooth contour of gears, having axially or obliquely directed teeth, can be examined and deviations from the true form graphically recorded. Other known devices serve for examining the helical configuration of gears, that is, the curved line of intersection between the tooth flank and cylinders extending coaxially with the axis of the gear between the addendum and dedendum circles. By this means either the course of the helix proper or that of the rectilinear generatrix which produces the helical surface and extends tangentially to the cylinder passing through the base circle of the gear is ascertained.

According to the invention for effecting the examining of the helix the gear and the rolling cylinder are prevented from rotation about the common axis, whilst the rectilinear path and the feeler means are moved tangentially to the rolling cylinder and parallel with the said common axis, respectively, in the relation of the trigonometric tangent of the angle of inclination of the helix coordinated with the rolling cylinder, whereas for the examining of the tooth contour the feeler member and the rectilinear path are set at rest and the common gear and rolling cylinder axis is moved parallel with the rectilinear path.

By these means the deviations of the involute-shaped tooth contours as well as of the helices of a gear from the respective theoretical forms can be ascertained.

In the accompanying drawings an embodiment of the invention is illustrated by way of example only, in which Fig. 1 is an elevation partly in section of the device according to the invention;

Fig. 3 shows an elevation of the measuring means inclusive of the helical wheel to be examined;

Fig. 4 is a schematic view of a helical gear tooth of involute-shaped contour and helical form;

Figs. 5 to 7 illustratively exemplify the two measuring methods, and

Fig. 8 is a detail of the drum resetting means.

Figure 1:
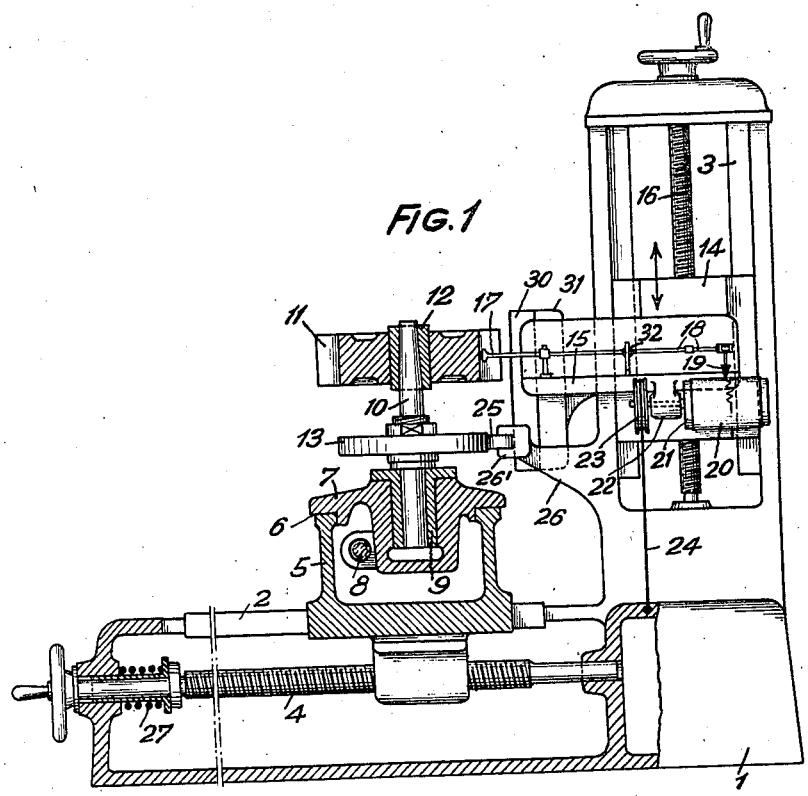
Figure 2:
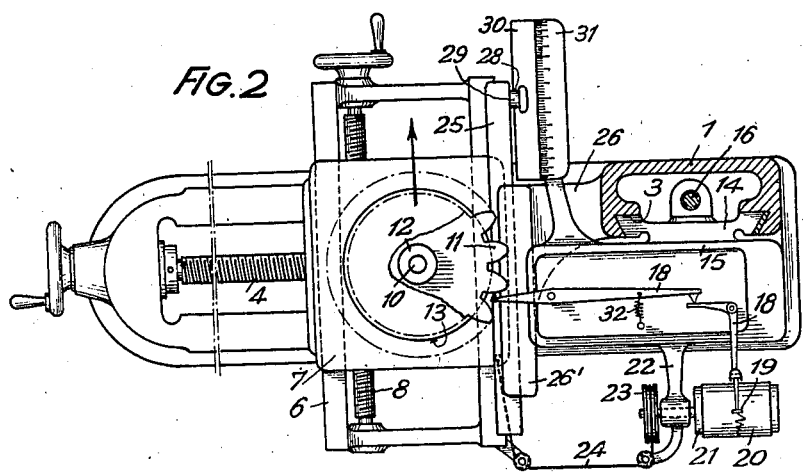
Fig. 2 is a top plan view of the device partly in section.

The base 1 of the device shown in Figs. 1 and 2 is provided with two slide guides, a horizontal guide 2 and a vertical guide 3. The former slidingly guides a slide 5 which is controllable by means of a spindle 4 and carries a slide track 6 on which a second slide 7 is movably arranged by means of a spindle 8. In a sleeve 9 of the slide 7 a mounting mandrel 10 is rotatably arranged. This mandrel serves on the one hand for the reception of the gear 11 to be examined which is fastened to the mandrel by means of a clamping sleeve 12. Further, a rolling cylinder 13 is secured to the mandrel.

A slide 14 carrying a table 15 is movable along the vertical slide guide 3, by means of a spindle 16, and carries the feeler and recording means. The tooth flank to be examined is contacted with by a feeler member 17, under the pressure of a spring 32, said member transmitting, by means of a leverage 18, the movements imparted thereto in highly multiplied form to a scriber 19 which records the aberration curve on the paper 20 supported by a recording drum 21. This drum is also secured to the table 15 by means of an arm 22. Rotational movement is imparted to the drum 21 by means of a sheave 23 for a cord 24. The recording drum 21 is rotationally reset by a spring 33 shown in Fig. 8.

A rule 25 is in frictional engagement with the rolling cylinder 13 so that these two parts can perform relative rolling movement without slippage occurring therebetween, the rule providing a rectilinear path for the cylinder. A required constant friction producting pressure is set up by a spring 27, which is interposed between the base 1 and the spindle 4, for moving the slide 3 together with the rolling cylinder 13, and which is compressed when the spindle is further turned after the rolling cylinder has moved into contact with the rule 25. An arm 26 of the base 1 is provided with a guide 26' in which the rule 25 can slide. The movement of the rule is controlled by a guide groove 28 which is provided in a supporting disc 30 (Figs. 2 and 3) and is engaged by an actuating member 29 of the rule 25. The disc 30 is rotatably arranged in a holder 31 to which it can be fixed. This holder is integral with the table 15. The vertical movement of the slide 14 is thus shared by the feeler member 17 inclusive of the leverage 18, the scriber 19, the recording drum 21, as well as the disc 30, carrying the guide groove 28, and displacing the rule 25 in the direction of its longitudinal axis by means of said groove. The rule is, therefore, arrested as long as the slide 14 is at standstill. The rolling cylinder 13 can, however, nevertheless roll on the rule, when the slide 7 is shifted parallel with the rule. Measuring is further also possible by conjoint movement of the two slides 7 and 14.

The operation of the device is as follows:

The device is adapted for use in examining involute-shaped tooth contours $e$ of a gear, as illustrated in Fig. 4, which are formed by the intersection of a plane $f$ extending perpendicularly to the axis X—X of the gear with the tooth flank. Furthermore, the device permits of examining each helix $s$ being formed by the intersection of any cylindrical surface $z$ coaxial with the gear axis X—X and passing through the tooth flank. Both said modes of examination are based on one and the same measuring member, that is, the rolling cylinder 13 (Figs. 5 to 7).

The diameter of said cylinder is equal to that of the cylinder passing through the base circle $g$ of the helical gear. The point of the feeler member 17 contacting with the tooth flank is located truly perpendicularly above the edge of the rule 25 (Fig. 5). This point thus describes an involute curve of the circle 13 when the rolling cylinder 13 rolls on the rule 25, with which curve the contour $e$ of the tooth must coincide. Deviations from the true involute-form are transmitted to the feeler member 17 following the tooth contour under the tension of the spring 32 and are recorded on the paper 20 which also moves, however, perpendicularly to the movement of the scriber 19. Said movement is effected by the end of the cord 24 of the sheave 23 (Fig. 2), serving for driving the recording drum, being attached to the slide 7 being displaced.

Consequently, for the recording of the tooth contour it is necessary to move the slide 7 parallel with the rule 25, by means of the spindle 8, while the rolling cylinder 13 rolls on the rule and the feeler member 17 slides on the tooth contour along a plane extending perpendicularly to the axis X—X of the gear. By the paper 20 being simultaneously pulled past the scriber in the manner explained above the contour curve P is obtained.

The examination of a helix of the tooth flank requires the feeler member 17 to be guided along the same. In turning the spindle 16, for example, so that the slide 14 moves in the upward direction, the table 15 inclusive of the feeler member 17, the recording drum 21 and the guide groove 28 move together therewith. Assuming that the path of travel thus passed through is equal to $a$ (Fig. 6) the corresponding displacement of the rule 25 to the right will amount to the length $b$. The rolling cylinder 13 being in frictional engagement with the rule then turns for a corresponding circumferential length $b$ (Fig. 7). The relation between the lengths $a$ and $b$ depends upon the inclination of the guide groove 28 to the vertical which inclination is represented by the angle of inclination $\beta_0$, the tangent T on the helix extending in the cylindrical surface passing through the base circle $g$ of the gear.

It is, therefore, $$\operatorname{tg} \beta_0 = \frac{b}{a}$$

However, since the feeler member 17 has been raised together with the slide 14 by the amount $a$ (Fig. 6) it follows that the point of the feeler member overlies at all times the tangent T where the latter contacts with the cylindrical surface passing through the base circle $g$, that is, the helix. In adjusting the guide groove 28 to the angle of inclination $\beta_0$ and a rolling cylinder 13 of a diameter equalling that of the base circle $g$ all of the helix portions between the addendum and dedendum circles of the gear can be examined. If, for example, the point of the feeler member overlies the circle $z$ (Figs. 4 and 7) and provided that the angle of inclination of the tangent on the helix coordinated with this circle equals $\beta$, it becomes $$\operatorname{tg} \beta = \frac{b'}{a}$$

Now as there is $$b' = \frac{d_z}{d_g} b = \text{range of rotational movement of circle } z,$$

if $d_z$ and $d_g$ represent the diameters of the circles $z$ and $g$, it follows that $$\operatorname{tg} \beta = \frac{d_z}{d_g} \operatorname{tg} \beta_0$$

or $$\frac{\operatorname{tg} \beta}{\operatorname{tg} \beta_0} = \frac{d_z}{d_g}$$

If, therefore, the displacement of the guide groove 28 has the effect that the movements of the circle $g$ and feeler member 17 are in a relation=tg $\beta_0$, that relation has a value=tg $\beta$ for the circle $z$. From this it follows that the feeler member will follow the helix extending in each cylindrical surface coaxial with the gear axis, that is, indicate the deviations of the helical tooth flank from the true helical form concerned. The rotational movement of the recording drum together with the paper 20 is effected in that the end of the cord 24 is this time attached to the base 1 of the device (Fig. 1), so that in raising or lowering the slide 14 and consequently also the recording drum 21 the paper 20 slides past the lower end of the scriber 19. In this way the helical curve H is obtained.

Helical tooth flanks free from aberration will yield straight lines as contour and helix test curves. If it is not required to examine these two curves each individually as to correctness of shape, but rather only the tooth flank on the whole, the spindles 8 and 16 are turned simultaneously in connection with which the end of the cord 24 may be attached either to the stationary base 1 (Fig. 1) or to the slide 7 (Fig. 2), as desired. By this means the feeler member 17 is caused to travel over the tooth flank in all longitudinal and transverse directions dependent upon the movements of the slides 7 and 14 for the time being. This mode of measuring is feasible, due to the fact that the same measuring member, rolling cylinder 13, and the same angular adjustment of the guide groove 28 relative to the gear axis amounting to the angle $\beta_0$ is required for the examination of the tooth contour as well as that of the various helices of a gear. In examining a gear with axially directed teeth the angle $\beta_0 = 0$, and the examination will make it clear if the tooth flanks are straight and extend parallel with the gear axis.

For the recording of the aberrations of the feeler member instead of the drum 21 a plane recording sheet may be used which may remain at standstill during the examination of the helix, whereas in testing the tooth contour the recording sheet would have to be moved past the scriber.

I claim:

1. In a device for examining gears, particularly helical gears, in regard to correctness of form of helical and straight tooth flanks as well as tooth contours, a rolling cylinder, a gear to be examined, a centering member common to said cylinder and the gear to be examined, said cylinder and gear being mounted for rotation together with said centering member, a rectilinear track, said cylinder engaging and rolling on said track by relative movement of said two parts, a feeler member for contacting with the tooth flanks of said gear, recording means cooperating with said feeler member for recording the aberrations of said feeler member from the true form required for said tooth flanks and said tooth contours, means for moving said feeler member parallel to said centering member while said centering member is kept from rotation and said track moves tangentilly to said cylinder, for examining the respective kind of said forms of tooth flank, and means for moving said centering member parallel to said track while said feeler member and said track are arrested, for examining said tooth contours.

2. In a device for examining gears, particularly helical gears, in regard to correctness of form of helical and straight tooth flanks as well as tooth contours, a rolling cylinder mounted for rotation together with a centering member common to said cylinder and a helical gear to be examined, a rectilinear track, said cylinder engaging and rolling on said track by relative movement of said two parts, a feeler member for contacting with the tooth flanks of said gear, recording means cooperating with said feeler member for recording the aberrations of said feeler member from the true form required for said tooth flanks and said tooth contours, means for moving said feeler member parallel to said centering member in the relation of the trigonometric tangent of the angle of inclination of the helix coordinated with said cylinder, while said centering member is kept from rotation and said track moves tangentially to said cylinder, for examining the helical form of said tooth flanks, and means for moving said centering member parallel to said track while said feeler member and said track are arrested, for examining said tooth contours.

3. In a device for examining gears, particularly helical gears, in regard to correctness of form of helical and straight tooth flanks as well as tooth contours, a frame sustaining said device, a rolling cylinder mounted for rotation together with a centering member common to said cylinder and the gear to be examined, a rectilinear rule having a rectilinear guide, said cylinder engaging and rolling on said rule by relative movement of said two parts, and being engaged with said rule by friction at a constant friction producing pressure, a spring intercalated between said frame and said cylinder producing said pressure, a feeler member for contacting with the tooth flanks of said gear, recording means cooperating with said feeler member for recording the aberrations of said feeler member from the true form required for said tooth flanks and said tooth contours, means for moving said feeler member parallel to said centering member, while said centering member is kept from rotation and said track moves tangentially to said cylinder for examining the respective kind of said forms of tooth flank, and means for moving said centering member parallel to said track while said feeler member and said track are arrested, for examining said tooth contours.

4. In a device for examining gears, particularly helical gears, in regard to correctness of form of helical and straight tooth flanks as well as tooth contours, a frame sustaining said device, a rolling cylinder mounted for rotation together with a centering member common to said cylinder and the gear to be examined, a rectilinear rule having a rectilinear guide, said cylinder engaging and rolling on said rule by relative movement of said two parts, and being engaged with said rule by friction at a constant friction producing pressure, a spring intercalated between said frame and said cylinder producing said pressure, a supporting member carrying a guide groove operatively connected with said rule, a feeler member for contacting with the tooth flanks of said gear, recording means cooperating with said feeler member for recording the aberrations of said feeler member from the true form required for said tooth flanks and said tooth contours, means for moving said feeler member together with said mounting member parallel to said centering member, thereby moving said rule tangentially to said cylinder while said centering member is kept from rotation, for examining the respective kind of said forms of tooth flank, and means for moving said centering member parallel to said track while said feeler member and said track are arrested, for examining said tooth contours.

5. In a device for examining gears, particularly helical gears, in regard to correctness of form of helical and straight tooth flanks as well as tooth contours, a frame sustaining said device, a rolling cylinder mounted for rotation together with a centering member common to said cylinder and the gear to be examined, a rectilinearly guided rule, said cylinder engaging and rolling on said rule by relative movement of said two parts, and being engaged with said rule by friction at a constant friction producing pressure, a spring intercalated between said frame and said cylinder producing said pressure, a supporting member carrying a guide groove operatively connected with said rule and rotatably mounted on a holder and fixable thereto, a feeler member arranged on a common carrier with said holder for contacting with the tooth flanks of said gear, recording means cooperating with said feeler member for recording the aberrations of said feeler member from the true form required for said tooth flanks and said tooth contours, means for moving said feeler member together with said mounting member parallel to said centering member, thereby moving said rule tangentially to said cylinder while said centering member is kept from rotation, for examining the respective kind of said forms of tooth flank, and means for moving said centering member parallel to said track while said feeler member and said track are arrested, for examining said tooth contours.

6. In a device for examining gears, particularly helical gears, in regard to correctness of form of helical and straight tooth flanks as well as tooth contours, a rolling cylinder mounted for rotation together with a centering member common to said cylinder and a helical gear to be examined at any point of its helical flanks, a rectilinear track, said cylinder engaging and rolling on said track by relative movement of said two parts, a supporting member carrying a guide groove operatively connected with said track, a feeler member for contacting with the tooth flanks of said gear, recording means cooperating with said feeler member for recording the aberrations of said feeler member from the true form required for said tooth flanks and said tooth contours, means for moving said feeler member parallel to said centering member in the relation of the trigonometric tangent of the angle of inclination of the helix coordinated with said cylinder, for examining the helical form of said tooth flanks at a certain point, said feeler member, said guide groove in said supporting member, and said track effecting their respective examination movements independently of said rolling movement of said cylinder on said track, and means for moving said centering member parallel to said track while said feeler member and said track are arrested, for examining said tooth contours.

DANIEL ERNST.